H. S. MAHAN.
ADJUSTABLE BOOK MARK RECORD.
APPLICATION FILED OCT. 27, 1916.
1,249,980.
Patented Dec. 11, 1917.
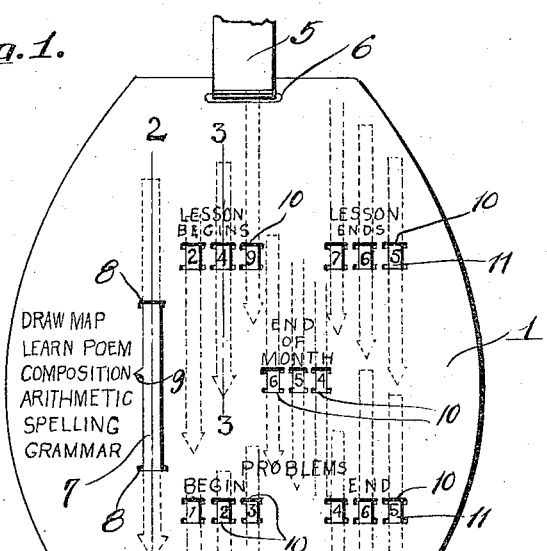
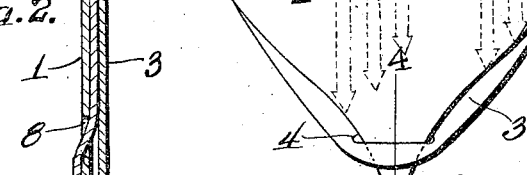
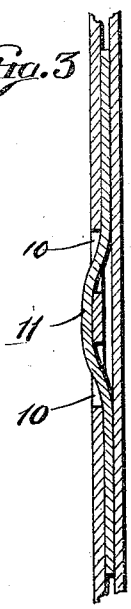
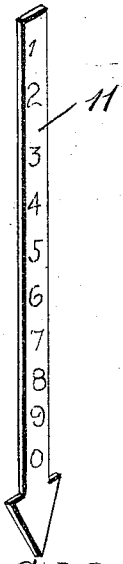
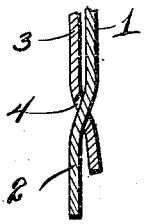
WITNESSES
Alfred Hazel
W. H. Mulligan
INVENTOR
Harold S. Mahan
Richard B. Owen
ATTORTEY

UNITED STATES PATENT OFFICE.

HAROLD S. MAHAN, OF EFFINGHAM, KANSAS.

ADJUSTABLE BOOK-MARK RECORD.

1,249,980. Specification of Letters Patent. Patented Dec. 11, 1917.

Application filed October 27, 1916. Serial No. 128,094.

*To all whom it may concern:*

Be it known that I, HAROLD S. MAHAN, a citizen of the United States, residing at Effingham, in the county of Atchison, in the State of Kansas, have invented a new and useful Adjustable Book-Mark Record, of which the following is a specification.

This invention relates to book marking devices and more particularly to an adjustable book mark adapted for use particularly by students and scholars studying from text books or the like and to whom a certain number of pages in the text book are assigned for each lesson in the course of instructions.

One of the objects of the invention is to provide a plurality of adjustable elements associated with the book mark and provided with certain indicia whereby the pages in the text book may be indicated to designate the point at which the lesson begins and ends; the page which is reached at the end of the month and other similar information relative to the text which the student is ordinarily required to remember if notes are not previously made.

The invention also aims to provide an adjustable book mark that will include a device for indicating to the student the next subject matter for the subsequent instruction.

The invention also includes the provision of a structure whereby the adjustable elements of the book mark will be held in proper fixed position when the device has been properly adjusted and which will serve during this fixed period, as a book mark for the volume which is being used.

The invention also aims to provide a book mark that will be extremely simple in construction, durable and well adapted to stand the rough uses to which devices of this character will be subjected.

For a full description of the invention and the advantages and merits thereof, reference is to be had to the following description and the accompanying drawings, wherein is illustrated the preferred form of my invention, in which;

Figure 1 is a front elevation of a book mark constructed in accordance with my invention.

Fig. 2 is an enlarged detail fragmentary section on the line 2—2 of Fig. 1.

Fig. 3 is an enlarged fragmentary section on the line 3—3 of Fig. 1.

Fig. 4 is an enlarged fragmentary section on the line 4—4 of Fig. 1.

Fig. 5 is a detail perspective view of one of the adjustable indicating elements.

Referring to the drawing wherein is illustrated the preferred form of my invention, and in which like characters of reference indicate corresponding parts throughout the several views, the front panel 1 is constructed from suitable thin flexible material and has its longitudinal edges curved so that it is substantially elliptical in formation, one end being drawn to a point as indicated at 2 for the purpose of providing a locking tongue for the front panel 1. The back panel 3 is of substantially the same form as the front panel 1 excepting its end is slightly elongated and rounded as indicated in Fig. 1 of the drawing and this rounded end is provided with a transverse slot 4 for the reception of the tongue to lock the two panels together. The opposite ends of the panels are held together by a tape or ribbon 5 passing through convenient slots 6 for holding these ends of the panels together.

Near one of the longitudinally curved edges of the front panel 1, and substantially in the center of the panel, I have inscribed a series of titles such as "Draw map," "Learn poem" etc.; these being the subject matter of certain lessons to be studied by the student. It will be understood that this list of different subject matters may be extended to any desired length according to the curriculum and in order that the proper subject matter may be correctly indicated and remembered I have provided a longitudinally adjustable point element 7 shown to advantage in Figs. 1 and 2 of the drawing. Near the upper and lower ends of the list of subjects, I have provided a slot 8 and the ends of the pointer element are projected through the slots so that a portion of the pointer element is exposed on the front panel. The ends of the pointer element are then disposed between the front and back panels and one end is provided with a head or enlargement for the purpose of preventing the pointer element from being accidentally withdrawn from the slot after once being placed in position. A projecting pointer 9 is formed on one longitudinal edge of the pointer element 7 and this pointer 9 comes into registration with any of the inscribed subject matters on the adjacent portion of the front panel. This pointer may be longitudinally adjusted to indicate any one of the subject matters which is to be studied by the student.

In the remaining portion of the panel I have provided a series of slots 10 which are arranged in pairs and slightly vertically spaced apart. The pairs are arranged in groups of three as will be apparent from a consideration of Fig. 1 of the drawing and each pair of slots receives one of the adjustable indicating elements 11, which consists of an elongated strip of suitable thin material having its surface inscribed with a series of numbers running in numerical order from 1 to 0. It will be obvious that it is merely necessary to adjust the elements 11 to properly indicate certain numbers in each group of three to indicate where a certain lesson is to begin, where it is to end, the page in the volume which should be reached by the end of the month, and certain pages where prescribed problems are to be studied or memorized. As shown in Fig. 3, one of the adjustable elements 11 is shown in cross section and it will be apparent that it is only necessary to unlock the tongue 2 from the rear panel and to lift the front panel so that access may be gained to the strip of material forming the adjustable elements. These may then be gripped by the fingers and moved to the desired position and the enlarged arrow heads on the ends of the strip will prevent accidental withdrawal from the slot.

It will be understood, of course, that the device is constructed from comparatively thin material and will lie flat between the pages of a book so that it will act as an excellent book mark in addition to the instructions to the student relative to the assignment. With this device it will be unnecessary to make note of the assignment.

From the foregoing it will be observed that a very simple and durable bookmark has been provided, the details of which embody the preferred form. I desire it to be understood, however, that slight changes in the minor details of construction may be made without departing from the spirit of the invention or the scope of the claims hereunto appended.

What I claim is:—

1. A book mark of the character described comprising a pair of panels arranged in superposed relation, means for locking the panels at one end, said means including a tongue formed on one of the said panels, the other panel having a slot for the reception of said tongue, and adjustable marking elements mounted on the front panel, the latter being provided with slots to receive the element, the said element having certain orderly arranged indicia thereon, and adapted to be longitudinally adjusted in the said slot.

2. A book marking device of the character described, comprising a pair of panels arranged in superposed relations, the front panel having a series of relatively narrow slots disposed in pairs, the pairs of slots being arranged in groups of three, each pair of slots having an adjustable indicating strip mounted therein for longitudinal movement, the ends of the said strip being disposed between the panel whereby the strip will be held removable when the panels are in relatively close contact, one of the said panels having a tongue engageable with the other panel to hold the two panels together.

3. A book marking device comprising a pair of superposed panels of substantially the same configuration, the end of the back panels being elongated and slightly rounded, the rounded end having a transverse slot provided therein, the said front panel being pointed at its end and adapted to provide a tongue for reception in the said slot, to lock the said panels together, and a plurality of indicia strips mounted on the front panel, the latter having a plurality of slots for the reception of the said strips whereby certain portions of the strips may be exposed.

4. A book marking device comprising a pair of superposed panels of substantially the same configuration, the end of the back panel being elongated and slightly rounded, the rounded end having a transverse slot provided therein, the said front panel being pointed at its end and adapted to provide a tongue for reception in the said slot, to lock the said panels together, the said front panel having a series of adjustable strips mounted thereon and portions of the said strips being exposed at the front of the panel, each strip being provided with certain indicia whereby adjustment of the strip will cause the indicia to be differently exposed on the front of the panel.

5. An adjustable book mark comprising a pair of superposed panels, means for locking the panels together, a series of inscriptions arranged on the front of the panel near the edge thereof, the said series being compiled to form a list, the said panel having a slot at the upper and lower end of the list, an adjustable pointer element mounted in the said slots to be adjustably and longitudinally moved over the front of the panels, and a pointer projecting from the said element to register with any one of the said inscriptions on the panel.

HAROLD S. MAHAN.

Copies of this patent may be obtained for five cents each, by addressing the "Commissioner of Patents, Washington, D. C."